Feb. 27, 1923.

G. WILCOX

COOKING APPARATUS

Filed Mar. 30, 1922    2 sheets-sheet 1

1,446,955

Inventor
George Wilcox
By Hazard & Miller
Attys.

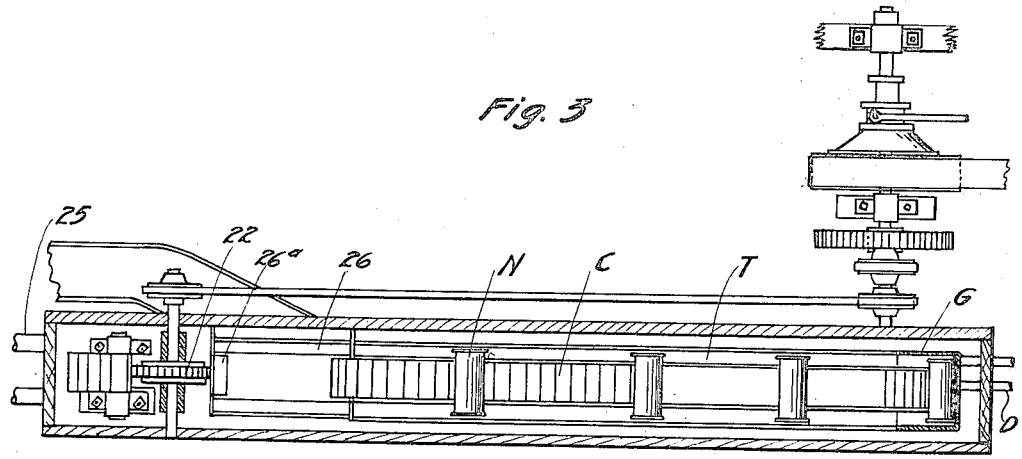
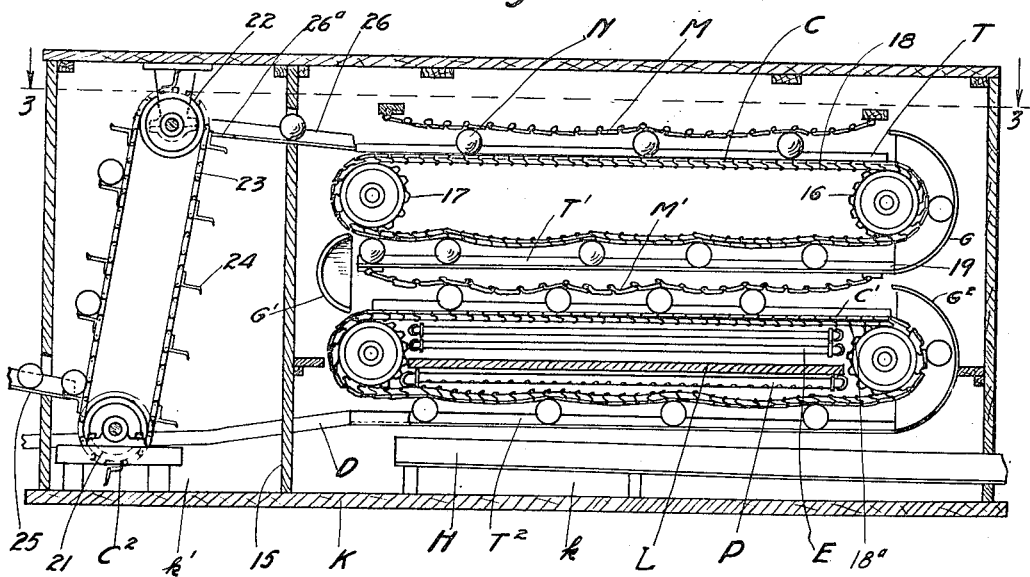

Patented Feb. 27, 1923.

1,446,955

UNITED STATES PATENT OFFICE.

GEORGE WILCOX, OF RIVERSIDE, CALIFORNIA, ASSIGNOR TO CALIFORNIA CANNING MACHINERY CO., OF LOS ANGELES, CALIFORNIA, A CORPORATION OF CALIFORNIA.

COOKING APPARATUS.

Application filed March 30, 1922. Serial No. 548,064.

*To all whom it may concern:*

Be it known that I, GEORGE WILCOX, a citizen of the United States, residing at Riverside, in the county of Riverside and State of California, have invented new and useful Improvements in Cooking Apparatus, of which the following is a specification.

My invention relates to apparatus for cooking foods in tins or cans, and more particularly to that type of apparatus in which the food containers are slowly and continuously moved through the apparatus with the cooking of the food taking place during this operation.

It is a purpose of my invention to provide a cooking apparatus of the above described character in which the tins or cans are rotated about their own axes during their movement through the apparatus thereby causing the food contents of the containers to be agitated to the extent that substantially all particles of food are brought into contact with the inner walls of the cans so that they are exposed to the cooking medium and thereby thoroughly cooked.

Although I will describe only one form of cooking apparatus embodying my invention and point out the novel features thereof in claims, it is to be understood that various changes and modifications may be made herein without departing from the spirit and scope of such claims.

In the accompanying drawings,

Fig. 3 is a longitudinal sectional view taken approximately on the line 3—3 of Fig. 4.

Fig. 4 is a central vertical sectional view of the apparatus shown in the preceding views.

Figure 1:
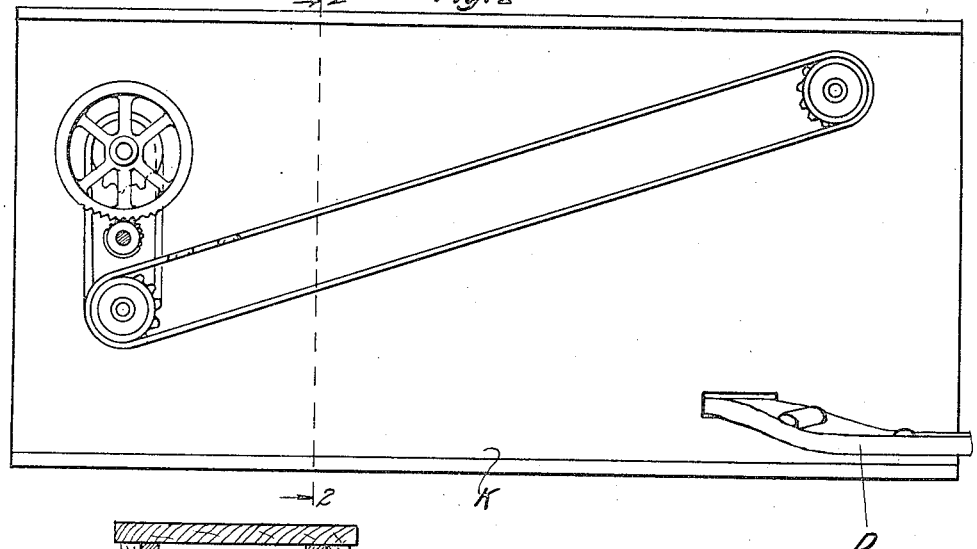
Figure 1 is a view showing in side elevation one form of cooking apparatus embodying my invention.

Referring specifically to the drawings in which similar reference characters refer to similar parts, my invention, in its present embodiment, comprises a casing designated at K which, as shown in Fig. 4, is provided with a partition 15 which serves to divide the casing interiorly into a cooking compartment $k$ and admitting and discharging compartment $k'$. The compartment $k$ is shown as provided with a set of horizontally arranged conveyors designated generally at C and C' respectively, and arranged one above the other. Each conveyor C or C' comprises spaced sprockets 16 and 17 about which is trained an endless chain 18. The reference characters designating the parts of the conveyor C' are provided with exponents for distinguishing the respective parts from corresponding parts of the conveyor C.

Guide members G, G' and $G^2$ are associated with the ends of the conveyors in the manner shown in Fig. 4, and these guide members are adapted to co-operate with angle bars 19 arranged in pairs to provide trackways for receiving and supporting the cans or tins designated at N during movement thereof under the action of the conveyor chains and for conducting the cans from one conveyor to the other. As shown in Fig. 2, I provide an upper trackway T above the upper conveyor C, an intermediate trackway T' between the upper and lower conveyors, and a lower trackway $T^2$, the latter communicating with a discharge chute D which extends to a point exteriorly of the casing K as is clearly shown in Fig. 1. The several angle bars forming the trackways are supported on beams or strips 20, and these strips are spaced apart to allow of the contacting of the chains 18 and $18^a$ with the cans when the latter are in position upon the angle bars.

A heating coil E is shown arranged within the compartment $k$ preferably at a point beneath the upper stretch of the chain $18^a$, and as will be understood that heat, either direct or by radiation, or both, is adapted to be supplied thereto for heating the compartment to effect a cooking of the contents of the cans. For cooling the cans prior to the discharge from the apparatus, a perforated pipe P is arranged within the compartment $k$ and directly above the lower stretch of the chain $18^a$. Water is adapted to be supplied to this pipe so that it is discharged through the perforations and onto the cans contained on the trackway $T^2$ thereby cooling the cans and their contents to permit handling of the same as they are discharged from the chute D. The water is conveyed from the apparatus by a trough H arranged beneath the conveyors in the manner clearly shown in Fig. 2 and having its discharge end disposed exteriorly of the casing.

A partition L is preferably interposed between the heating coil E and the cooling pipes P to prevent the cooling action of the water effecting the heating coil or vice versa.

The cans or tins are adapted to be delivered to the upper stretch of the chain 18 by means of an elevating conveyor designated generally at C² arranged within the compartments k'. This conveyor comprises sprockets 21 and 22 mounted for rotation and above which is trained an endless chain 23 having lifting flanges 24 arranged at intervals thereon which are adapted to accommodate the tins and to effect elevation thereof when the chain is rotated. The cans are adapted to be delivered to the elevating conveyor through a chute 25 which, as clearly shown in Fig. 4, is extended through a suitable opening formed in the casing. This chute is inclined so that the cans gravitate into contact with the chains 23 where they are engaged by the lifting flanges 24. A receiving chute 26 is arranged adjacent the sprocket 22, and this chute is provided with an opening 26ª which allows of the passage of the lifting flanges 24 therethrough, but which engages the cans so as to remove the latter from the chain. The chute 26ª is inclined and its discharge end is disposed adjacent one end of the trackway T so that as the cans are dropped upon the chute they gravitate onto the trackway and into engagement with the chain 18.

For the purpose of effecting rotation of the cans to cause an agitation of their contents, suitably fastened slack chains or other flexible members indicated at M and M' are associated with the uppermost stretches of the chains 18 and 18ª to cause each can to rotate about its own axis during movement thereof by the conveyor chains. Because of the frictional contact set up by the slack chains M and M' it will be clear that during the movement of the chains 18 and 18ª, rotation of the cans about their own axes is effected and during the forward movement of the cans under the action of the conveyor chains. As shown in Fig. 4, the lower stretches of the chains 18 and 18ª are also slackened so that they function in the same manner as the chains M and M' to cause rotation of the cans about their own axes while being moved along the trackways.

From this operation it will be seen that from the time the cans enter the cooking compartments until they are discharged therefrom, they are kept in constant but relatively slow rotation so that the contents thereof are agitated. This agitation is such that most of the contents are at one time or another in direct contact with the inner walls of the cans thereby insuring proper cooking of all of the contents of each and every can.

Figure 2:
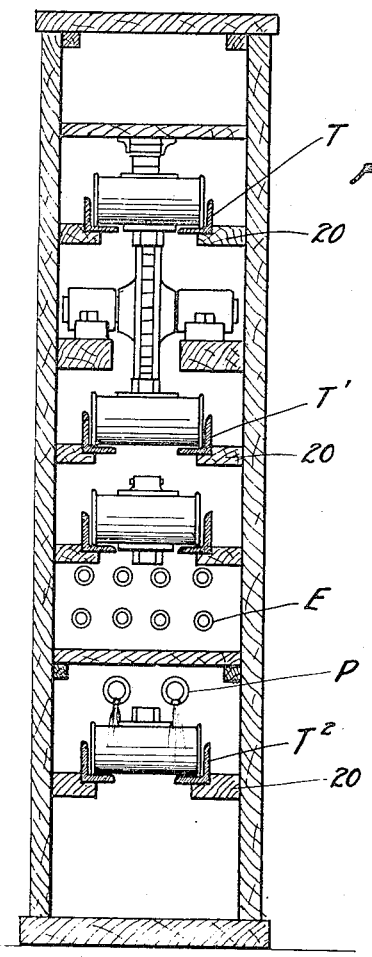
Fig. 2 is a vertical sectional view taken on the line 2—2 of Fig. 1.

Any suitable means may be provided for effecting a continuous driving of the conveyors C, C' and C², and in Figs. 1 and 2 I have shown a conventional form of driving means.

What I claim is:

1. A cooking apparatus of the character described comprising trackways upon which food containers are adapted to be supported, conveyor chains movable through the trackways for effecting movement of the containers along the trackways, and flexible means associated with the trackways for effecting rotation of the containers during their movement along the trackways.

2. A cooking apparatus of the character described comprising trackways upon which food containers are adapted to be supported, conveyor chains movable through the trackways for effecting movement of the containers along the trackways, and chains associated with the trackways for effecting rotation of the containers during their movement along the trackways.

3. A cooking apparatus of the character described comprising trackways arranged one above the other, conveyor chains arranged one above the other and each including a taut stretch movable through the trackways and a slack stretch movable above the trackways, and slackened chains arranged above the trackways, said stretches and chains being arranged to engage cans sustained on the trackways for the purpose described.

4. A cooking apparatus of the character described comprising a trackway upon which containers are adapted to be supported, means for moving the containers along the trackways, and means independent of the first means for effecting bodily rotation thereof during said movement.

5. A cooking apparatus of the character described comprising a trackway upon which containers are adapted to be supported, means for moving the containers along the trackway, and slackened chains for effecting bodily rotation thereof during said movement.

6. A cooking apparatus of the character described comprising a pair of endless conveyors arranged one above the other and including chains, trackways upon which containers are adapted to be supported, said trackways being arranged to receive the upper stretches of said chains, elevating means for delivering containers to the uppermost trackway, heating means associated with the conveyors, cooling means associated with one of the trackways, and flexible chains adapted for effecting rotation of the containers during their movement along said trackways.

7. A cooking apparatus of the character described comprising a pair of endless conveyors arranged one above the other and including chains, trackways upon which containers are adapted to be supported, said trackways being arranged to receive the upper stretches of said chains, elevating means for delivering containers to the uppermost trackway, guide members for conducting the containers from one conveyor to the other, and flexible members associated with the trackways for effecting rotation of the containers as they are moved along the trackways.

8. A cooking apparatus comprising a trackway upon which food containers are adapted to be supported, means for effecting movement of the containers along the track way, and flexible means associated with the track way for effecting rotation of the containers during their movement along the track way.

9. A cooking apparatus comprising trackways arranged one above the other, and conveyor chains arranged one above the other and each including a taut stretch movable through the trackways and a slackened stretch movable above the track ways.

10. A cooking apparatus comprising a track way upon which food containers are adapted to be supported, means for effecting movement of the containers along the trackway, and slackened chains associated with the trackway for effecting rotation of the containers during their movement along the trackway.

In testimony whereof I have signed my name to this specification.

GEORGE WILCOX.